United States Patent [19]

Ozawa et al.

[11] Patent Number: 5,514,753

[45] Date of Patent: May 7, 1996

[54] PROCESS FOR PREPARING A BLOCK COPOLYMER

[75] Inventors: Yoichi Ozawa; Ryota Fujio, both of Tokyo, Japan

[73] Assignee: Bridgestone Corporation, Tokyo, Japan

[21] Appl. No.: 268,323

[22] Filed: Jun. 30, 1994

[30] Foreign Application Priority Data

Jun. 30, 1993 [JP] Japan .................................. 5-188896

[51] Int. Cl.$^6$ ........................ C08F 271/02; C08F 265/06
[52] U.S. Cl. ........................ 525/279; 525/247; 525/299; 525/309
[58] Field of Search ................................ 525/299, 309, 525/247, 279

[56] References Cited

U.S. PATENT DOCUMENTS

| | | | |
|---|---|---|---|
| 4,405,754 | 9/1983 | Moczygemba | 525/102 |
| 4,778,852 | 10/1988 | Futamura | 525/97 |
| 5,002,676 | 3/1991 | Willis | 252/56 R |
| 5,194,510 | 3/1993 | Du Bois | 525/299 |

FOREIGN PATENT DOCUMENTS 2056310  5/1971  Germany .

Primary Examiner—Joseph L. Schofer
Assistant Examiner—I. Zemel
Attorney, Agent, or Firm—Sughrue, Mion, Zinn, Macpeak & Seas

[57] ABSTRACT

A block copolymer containing a non-polar polymer block and a polar polymer block was prepared by using an anionic polymerization initiator, by reacting an organic compound which can form an ate complex at the active end of the non-polar polymer block, the compound which contains a main group element of II or III group, before the addition of the polar monomer.

25 Claims, 2 Drawing Sheets

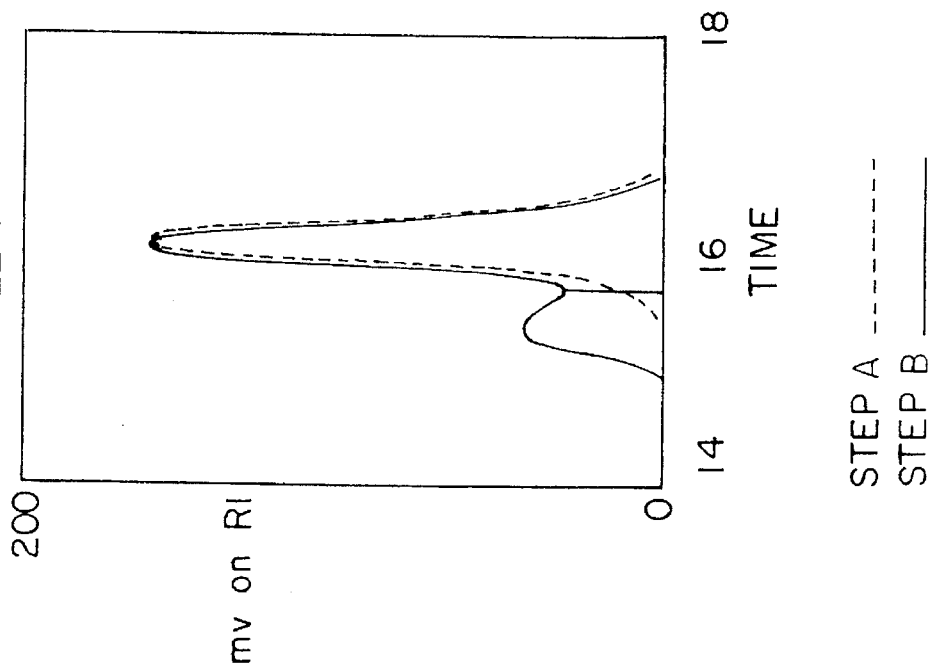
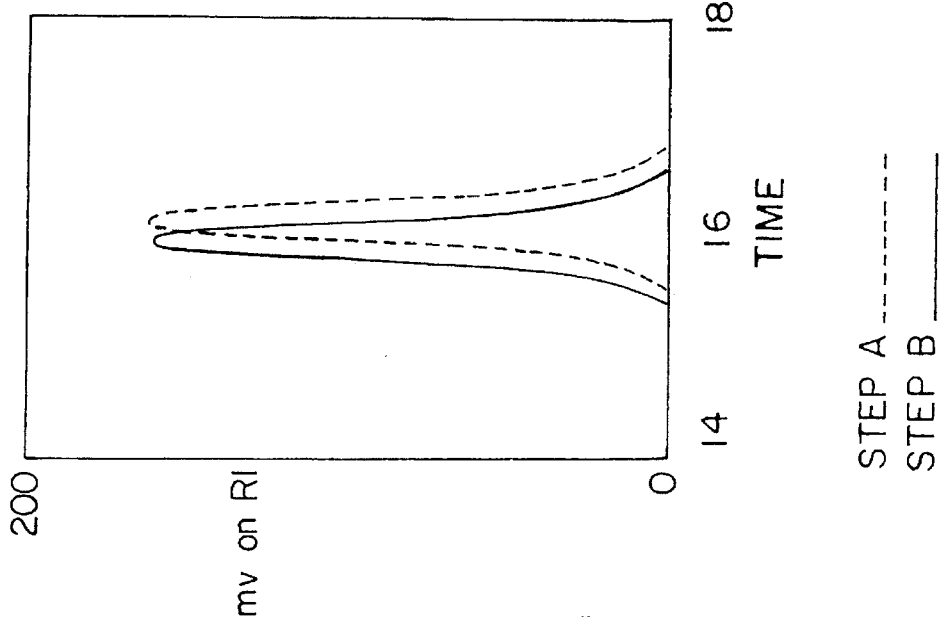

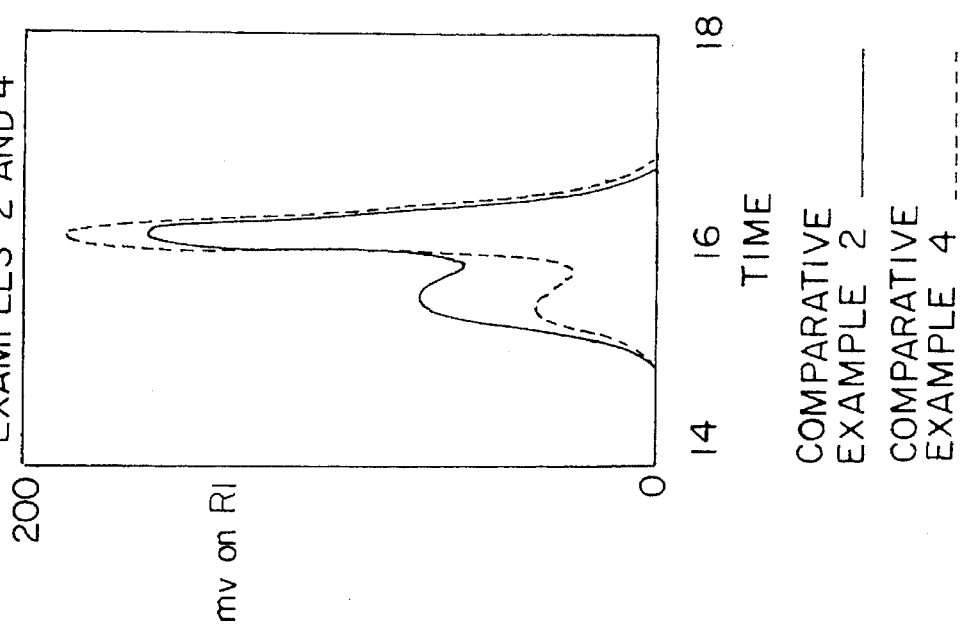
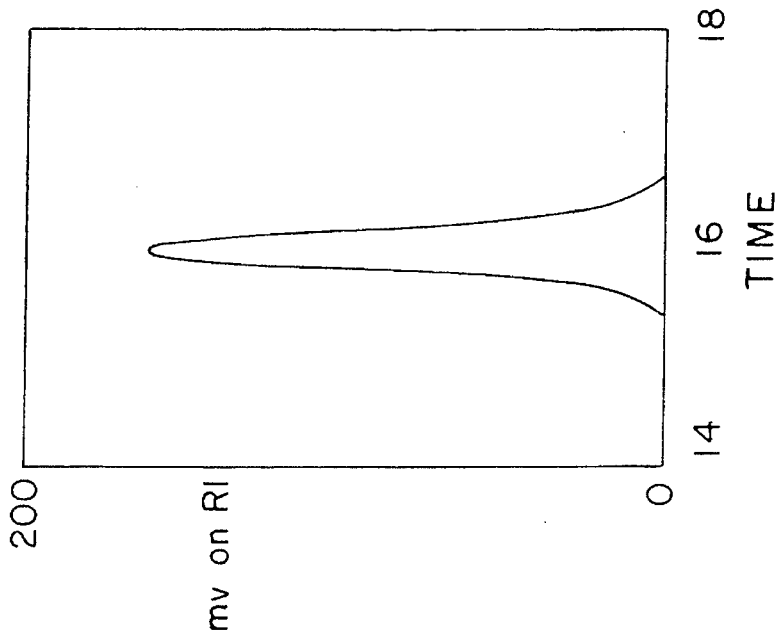

PROCESS FOR PREPARING A BLOCK COPOLYMER

FIELD OF THE INVENTION

The invention relates to a process for preparing a block copolymer of a non-polar block and a polar block by using an anionic polymerization initiator through a formation of an ate complex.

BACKGROUND OF THE INVENTION

A block copolymer having a non-polar polymer block and a polar polymer block has features coming from both segments, and has a lot of possible applications. In order to give these properties, the microstructure of each segments has to fall within a certain range. A process to control the molecular structure of the resulting block copolymer as desired, with high yield and with good producibility, has been sought.

In general, a process for preparing such a block copolymer includes steps A and B as follows:

A) a step consisting of homopolymerizing or copolymerizing a conjugated diene monomer and/or an aromatic vinyl hydrocarbon monomer in order to obtain the non-polar polymer block;

B) a step homopolymerizing or copolymerizing a polar monomer in order to obtain the polar polymer block.

And it is well known that a conjugated diene monomer, such as 1,3-butadiene, and isoprene, an aromatic vinyl hydrocarbon monomer, such as styrene, or a monomer containing a polar group (will be referred as a polar monomer), such as an ester of acrylic acid and methacrylic acid, and N,N-dialkylacrylamide can be polymerized by an anionic polymerization.

But to prepare a block copolymer containing a non-polar polymer block and a polar polymer block by an anionic polymerization is not straightforward.

In general, the carbanion at an active end of a polymer has a high reactivity towards a polar monomer and attacks not only vinyl linkage of a monomer but also other polar groups, such as a carbonyl group. As a result, there is a high possibility that polymerization would be disturbed. Further, because of these side reactions, to control the microstructure of the resulting polymer is difficult, which will lead to a formation of a polymer with undesirable properties.

To overcome these difficulties, a process which can lower the reactivity of the carbanion at the polymer end towards a polar monomer has been studied in order to provide a block copolymer containing both a non-polar polymer block and a polar polymer block.

Some of these processes include (1) to form the polar polymer block at a low temperature of below zero, (2) to add a 1,1-diphenylethylene compound to form a bulkier carbanion, which has lower reactivity towards a polar monomer, to react with the active ends of polymers before adding a polar monomer (D. Freiss, P. Rempp and H. Benoit, *Polym. Lett.*, 2, 217, (1964)), and (3) to add a polar monomer in the presence of an excess amount of an ether compound, such as tetrahydrofuran (THF) (JP-A-1-131221).

Even though these processes of (1) to (3) can provide a block copolymer of desirable molecular structure and with desirable properties, in the process (1), since an anionic polymerization is often carried out at ambient temperature or higher temperature, cooling below zero causes a higher cost, viscosity increase, longer reaction time, and lower reactivity of the polar monomer; in the process (2), 1,1-diphenylethylene compound which has to be used is expensive and, sometimes, cooling is necessary; and in the process (3), the addition of an ether compound causes a declination in producibility, that is, if the ether compound is added before or during the formation of the non-polar polymer block, the content of vinyl linkage increases, which restricts the microstructure of the resulting polymer, and if the ether compound is added after the formation of the non-polar polymer block is completed, the impurities, such as water, in the ether compound deactivate some of the polymer ends, and will cause a formation of a polymer with only a non-polar polymer block and a loss of control over conversion of the polar monomer.

SUMMARY OF THE INVENTION

An object of the present invention is to provide an industrially suitable process for preparing a block copolymer containing a non-polar polymer block and a polar polymer block, and having an aimed microstructure with high yield and with good producibility.

Another object of the present invention is to provide a process for preparing a block copolymer containing a non-polar polymer block and a polar block, and having a narrow molecular weight distribution, at an industrially useful temperature with a high yield and with a good producibility.

In the process in accordance with the present invention, a conjugated diene monomer and/or an aromatic vinyl hydrocarbon monomer are homopolymerized or copolymerized by using an anionic initiator to provide a non-polar polymer block with an active end, and before a polar monomer is added to the polymerization system, an organic compound containing a main group element of II or III group is reacted to the active end to form an ate complex.

A multivalent initiator may as well as a monovalent initiator be used in the present invention.

The present inventors have been focussing upon the fact that when an organolithium and a main element atom of II or III group, such as triethylaluminum, are in a same system, preferably, in a particular range of a ratio, they form an ate complex which has an ability to polymerize a polar monomer, such as methacrylates, at a moderate rate, and did a thorough study. They have found that by adding the organic compound which can form an ate complex as described above to a living polymer or copolymer of a conjugated diene and/or an aromatic hydrocarbon to form an ate complex at an end of the polymer or copolymer chain before reacting a polar monomer to it, the block copolymer containing a non-polar polymer block and a polar polymer block can be obtained with much ease and reliability without adding an additional condition to any step of the polymerization process.

An ate complex is an anionic organocomplex which has a coordination bond between an alkyl or an aryl compound of a strong electron accepting element, such as boron, aluminum, and zinc, and an organoalkalimetal or, sometimes, a Grignard reagent.

The mechanism of a formation of an ate complex is shown below, as a combination of a trialkylaluminum ($R_3Al$) and an organolithium ($R'Li$) is chosen as an example:

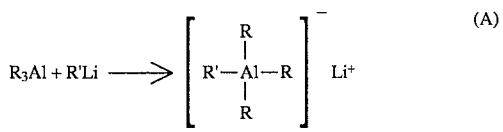

(A)

This mechanism can be applied to a polymerization process in accordance with the present invention by placing a homopolymer or a copolymer having an active end, such as polybutadienyllithium, in stead of the organolithium.

The new mechanism can be shown as follows:

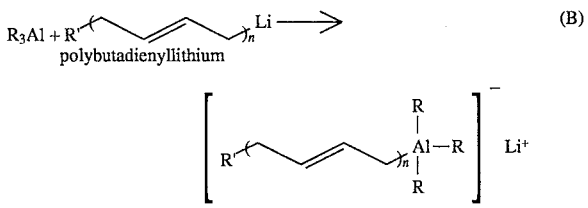

(B)

The equation (B) above shows that when initiating a polymerization with a monovalent initiator, a polymer with (Non-polar-block)-(Polar-block) structure is obtained. And similar to the case described in equation B, when initiating a polymerization with a divalent initiator, a polymer with (Polar-block)-(Non-polar-block)-(Polar-block) structure is obtained, and when a n-valent initiator is used to initiate a polymerization, a radial polymer with (Polar-block)-(Non-polar-block)-(Polar-block)$_{n-1}$ structure is obtained.

These organic compounds can effectively eliminate the polymerization impurities, such as water, since they are active towards those impurities. As a result, a block copolymer having a non-polar polymer block and a polar polymer block can be obtained much more easily and reliably.

BRIEF DESCRIPTION OF THE DRAWINGS

FIGS. 1A and 1B show molecular weight distribution curves of the polymers obtained by example 1 (FIG. 1A) and comparative example 1 (FIG. 1B) after both steps A and B.

FIGS. 2A and 2B show molecular weight distribution curves of the polymers obtained by example 3 and comparative examples 2 and 4.

DETAILED DESCRIPTION OF THE INVENTION

In this specification, when discussing the non-polar polymer block, a polymer means a homopolymer or a copolymer of a conjugated diene compound or an aromatic hydrocarbon compound or a copolymer of a conjugated diene compound and an aromatic hydrocarbon compound, a polymerization means a homopolymerization or a copolymerization of a conjugated diene compound or an aromatic hydrocarbon compound, or a copolymerization of a conjugated diene compound and an aromatic hydrocarbon compound, and to polymerize means to homopolymerize or to copolymerize a conjugated diene compound or an aromatic hydrocarbon compound, or to copolymerize a conjugated diene compound and an aromatic hydrocarbon compound. And also, an ate complex means an ate complex at the active end of a polymer or copolymer.

The polymerization process in the present invention includes two steps, A and B.

In step A, a conjugated diene monomer and/or an aromatic vinyl hydrocarbon monomer are polymerized by using an anionic initiator to form a non-polar polymer block with an active end. An organic compound containing a main group element of II or III group is reacted to said active end to form an ate complex during or after the non-polar block is formed.

In step B, a polar monomer is reacted to the ate complex to form a polar block.

Any known anionic polymerization initiator may be used in the present invention. Examples of an initiator include organometal compounds, such as organolithium compounds and organosodium compounds. Preferable examples are alkyllithiums, aryllithiums, aralkyllithiums, alkyltinlithiums, amidelithiums, alkylsodiums, arylsodiums, aralkylsodiums, alkyltinsodiums, amidesodiums. Those compounds containing one lithium atom or two of them, which are monovalent or divalent polymerization initiators, are more preferable because of their solubility to solvent and producibility.

Examples of suitable initiator include alkyllithiums and alkylenedilithiums, such as methyllithium, ethyllithium, propyllithium, butyllithiums, hexyllithium, octyllithium, tetramethylenedilithium, pentamethylenedilithium, and hexamethylenedilithium, aryllithiums and aryldilithiums, such as phenyllithium, tolyllithium, and lithium naphthylide, aralkyllithiums and aralkyldilithiums, such as benzyllithium, a reaction product of diisopropenylbenzene and butyllithiums, alkyltinlithiums, such as tributyltinlithiums, amidelithiums, such as hexamethyleneimidelithium. As a monovalent initiator, n-butyllithium and sec-butyllithium are more preferable.

The amount of the initiator is not critical. It depends on the aimed molecular weight of resulting polymer. To increase the molecular weight of the resulting polymer, the amount of the initiator should be decreased. Still it is preferably not less than 0.05 millimoles per 100 of monomer, since if the amount is less than 0.05 millimoles per 100 g of monomer, polymerization might not occur at all. And more preferably, the amount is 0.05 to 20.0 millimoles per 100 of monomer. When the amount of the initiator exceeds 20.0 millimoles, it becomes difficult to obtain a high molecular weight polymer.

The non-polar polymer block in accordance with the present invention can be formed by polymerizing a conjugated diene monomer and/or an aromatic vinyl hydrocarbon monomer.

Any suitable conjugated diene compound may be used in the present invention. The conjugated diene compound may preferably contain 4 to 12 carbon atoms, more preferably, 4 to 8 carbon atoms, such as 1,3-butadiene, isoprene, piperilene, 2,3-dimethyl-1,3-butadiene, 1,3-pentadiene, 2,3-dimethylbutadiene, 2-phenyl-1,3-butadiene, and 1,3 -hexadiene. These monomers can be used by itself or as a mixture of 2 or more of them. The more preferable examples of a conjugated diene monomer are 1,3-butadiene and isoprene from the industrial point of view.

Any suitable aromatic vinyl hydrocarbon compound may be used in the present invention. The examples of preferable aromatic vinyl hydrocarbon compound are styrene, α-methylstyrene, 1-vinylnaphthalene, 3-vinyltoluene, ethylvinylbenzene, divinylbenzene, 1,1-diphenylethylene, 2,4,6-trimethylstyrene. These monomers may be used by itself or as a mixture of 2 or more of them. The most preferable example is styrene also from the industrial point of view.

Any suitable polar monomer may be used in the present invention. The examples of the polar monomer are esters with an alcoholic residue having 1 to 20 carbon atoms when considering reactivity, N,N-dialkylacrylamides with each of the alkyl group having 1 to 10 carbon atoms when considering reactivity, vinylpyridines, and maleimides. If an ester is used as a polar monomer, one with a secondary or tertiary alcoholic residue is more preferable, because of the less possibility of side reactions. The polar monomers can be used by itself or as a mixture of any combination of two or more of them.

Suitable examples of esters are acrylates, such as methylacrylate, ethylacrylate, isopropylacrylate, primary-butylacrylate, secondary-butylacrylate, tertiary-butylacrylate, isobutylacrylate, cyclohexylacrylate, 2 -ethylhexylacrylate, isobornylacrylate, adamantylacrylate, dimethyladamantylacrylate, and laurylacrylate, methacrylates, such as methylmethacrylate, ethylmethacrylate, isopropylmethacrylate, primary-butylmethacrylate, secondary-butylmethacrylate, tertiary-butylmethacrylate, isobutylmethacrylate, cyclohexylmethacrylate, 2-ethylhexylmethacrylate, isobornylmethacrylate, adamantylmethacrylate, dimethyladamantylmethacrylate, and laurylmethacrylate.

Suitable examples of N,N-dialkylacrylamides are N,N-dimethylacrylamide, N,N-diethylacrylamide, and N,N-diisopropylacrylamide.

Suitable examples of vinylpyridines are 2 -vinylpyridine, and 4-vinylpyridine.

Suitable examples of maleimides are N-methylmaleimide, N-ethylmaleimide, N-phenylmaleimide.

In general, when a copolymerization of a copolymer having a non-polar polymer block and a polar block is carried out anionically, polar monomer cannot be introduced to the system until aimed non-polar block if formed, since once a polar monomer came into the system, the carbanion would show no reactivity towards a non-polar monomer, and as a result, copolymer obtained would have different microstructure from the aimed one, or if a polar monomer was introduced into the system before a non-polar monomer, no block copolymer would be obtained. So, in the present invention, a polar monomer is introduced to the system after the non-polar polymer block is formed.

The compound which can form an ate complex is an organic compound which has a general formulae of $M^1R^1R^2$ (formula I), or $M^2R^3R^4R^5$ (formula II) wherein $M^1$ is a main element atom of II group, $M^2$ is a main element atom of III group, $R^1$, $R^2$, $R^3$, $R^4$, and $R^5$ are aliphatic hydrocarbon compounds of 1 to 20 carbon atoms, cycloaliphatic hydrocarbon compounds of 2 to 20 carbon atoms, and aromatic hydrocarbon compounds of 6 to 20 carbon atoms.

The main element atoms of II group described above are beryllium, magnesium, calcium, strontium, barium, radium, zinc, cadmium, and mercury. The main element atoms of III group described above are boron, aluminum, gallium, indium, and thallium. The preferable examples are aluminum, boron, magnesium and zinc because they are more effective, and the most preferable example is aluminum because aluminum is easily obtained industrially.

Preferable organic compounds having the general formula I described above have $R^1$, and $R^2$, each of which are selected from the group consisting of aliphatic hydrocarbon compounds having 1 to 10 carbon atoms, cycloaliphatic hydrocarbon compounds having 3 to 10 carbon atoms, or aromatic hydrocarbon compounds having 6 to 10 carbon atoms separately from reactivity and the industrial point of view. The examples of preferable organic compounds are diethylmagnesium, dipropylmagnesium, dicyclohexylmagnesium, diphenylmagnesium, diethylzinc, dibutylzinc, and diphenylzinc.

Preferable organic compounds having the general formula II described above have $R^3$, $R^4$, and $R^5$, each of which are selected from the group consisting of aliphatic hydrocarbon compounds having 1 to 10 carbon atoms, cycloaliphatic hydrocarbon compounds having 3 to 10 carbon atoms, or aromatic hydrocarbon compounds having 6 to 10 carbon atoms. The examples of preferable organic compounds are triethylaluminum, tripropylaluminum, tributylaluminums, trimethylboron, triethylboron, and tributylboron.

In the present invention, the organic compound is added to the system before the polar monomer is introduced, that is, during or after the non-polar block is formed and when no polar monomer exist in the system. To maintain the practical processability, the organic compound is added to the system after the conversion of the non-polar block reaches 90%. If it is added before the conversion reaches 90%, reactivity of the carbanion towards the non-polar monomer becomes low and polymerization takes long time, and if it is added after the addition of polar monomer, no effect of this invention can be obtained.

The organic compound in accordance with the present invention which has a general formula of I or II can be used by itself or as a mixture of any combination of two or more of them.

The amount of the organic compound, preferably, is 0.5 to 10.0 mole equivalents per 1 mole equivalent of anionic polymerization initiator, and more preferably, is 0.8 to 5.0 mole equivalents per 1 mole equivalent of anionic polymerization initiator. If the amount is less than 0.5 mole equivalent per 1 mole of initiator, the effect might not be significant, and if the amount exceeds 10.0 mole equivalent per 1 mole of polymerization initiator, reactivity of the polymer end is declined and the rate of polymerization becomes slow, and workup after the polymerization becomes hard because the concentration of the residue of the organic compound, such as $M(OH)_x$, which has to be removed from the polymerization system increase, and further, the process costs more than necessary.

Preferable polymerization temperature for preparing the non-polar polymer block is about –80° C. to 150° C. More preferably, the temperature is –20° C. to 120° C. Preferable polymerization temperature for preparing the polar polymer block is about –80° C. to 120° C. More preferably, the temperature is –40° C. to 80° C.

Polymerization can be carried out without controlling the pressure of the system, but it is preferable to control the pressure within the range that the polymerization system is kept in liquid phase. It is also possible to increase the pressure higher. The pressure can be controlled by any known method, such as to pressurize the polymerization reactor in the presence of an inert gas.

The polymerization can be carried out in any known method, such as batchwise or continuously, or at a constant temperature or adiabatically, but it is preferably carried out in a hydrocarbon solvent because the control of both the reactivity of the carbanion and the viscosity of the system is much easier.

Any known aliphatic, cycloaliphatic, aromatic hydrocarbon solvent can be used. Preferably, the solvent is liquid at room temperature, and/or is a saturated hydrocarbon compounds having 5 to 10 carbon atoms. The examples of suitable solvents are propane, butane, pentane, hexane, heptane, isooctane, cyclopentane, cyclohexane, methylcyclohexane, decane, benzene, naphthalene, and tetrohydronaphthalene. These solvents can be used by itself or as a mixture of two or more of them.

The amount of the solvent is not critical, and can be chosen freely within the range in which a conventional anionic polymerization is carried out. Preferably, the amount of the solvent is chosen to make the concentration of the final polymer 10 to 40 weight %.

A randomizer can be used depending upon the aimed microstructure in the non-polar polymer block. The role of a randomizer is to control the molecular structure of the non-polar polymer block, for example, to increase the content of 1,2-linkage of a polybutadiene or of the butadiene portion in a styrene-butadiene polymer, to increase the content of 3,4-linkage of the isoprene portion when a polymer contains isoprene as a monomer, to control distribution of monomer units, such as butadiene units and styrene units, in butadiene-styrene copolymer.

The type of the randomizer is not critical in the present invention. Any randomizer known in conventional anionic polymerization can be used as a randomizer. The suitable examples are ethers, tertiary amines, and compounds which have a general formula of one of followings: $R(OM^1)_n$, $(RO)_2M^2$, $R(COOM^1)_n$, $ROCOOM^1$, $RSO_3M^1$, $ROSO_3M^1$, $R^2NM^1$, wherein R is selected from the group consisting of aliphatic groups, aromatic groups, and cycloaliphatic groups, $M^1$ is an alkali metal including lithium sodium, potassium, rubidium, and cesium, $M^2$ is an alkali earth metal including calcium, and barium, and n is an integer of 1 to 3. Preferably, the randomizer is an ether compound.

Any suitable ether compound may be used in the present invention, including, for example, 1,2-dimethoxyethane, 1,2-diethoxyethane, tetrahydrofuran, 2-methoxytetrahydrofuran, diethylether, and triethyleneglycoldimethylether.

Any suitable tertiary amine compound may be used in the present invention, including, for example, triethylamine, tripropylamine, pyridine, N-methylmorpholine, N,N,N',N'-tetramethylethylenediamine, and N,N,N',N'-tetraethylethylenediamine.

Any suitable compounds which has a general formula of one of those described above can be used in the present invention.

Examples of compounds having a general formula of $R(OM^1)_n$, or $(RO)_2M^2$ includes lithium salts, sodium salts, potassium salts, rubidium salts, cesium salts, calcium salts, and barium salts of methyl alcohol, ethyl alcohol, isopropyl alcohol, tert-butyl alcohol, tert-amyl alcohol, cyclohexyl alcohol, allyl alcohol, 2-butenyl alcohol, benzyl alcohol, phenol, catechol, resorcinol, hydroquinone, 1-naphthyl alcohol, p-nonylphenol, pyrogallol.

Examples of compounds having a general formula of $R(COOM^1)_n$ or $ROCOOM^1$ includes sodium salts, potassium salts, rubidium salts, cesium salts of isovaleric acid, lauric acid, palmitic acid, stearic acid, oleic acid, resin acid, benzoic acid, pimelic acid, n-dodecyl acidic carbonate, phenyl acidic carbonate.

Examples of compounds having a general formula of $RSO_3M^1$, $ROSO_3M^1$ or $R^2NM^1$ includes sodium salts, potassium salts, rubidium salts, cesium salts of dodecylbenzenesulfonic acid, diisopropylnaphthalenesulfonic acid, laurilamide of N-methyl-N-methanesulfonic acid salt, sulfuric acid ester salt of lauryl alcohol, caproylethyleneglycol sulfuric acid ester. An ether compound is more preferable because it can control the microstructure of the non-polar polymer block more easily.

The amount of the randomizer used is not critical and can be varied depending upon the aimed microstructure of the resulting non-polar polymer block. Preferably, the amount of the randomizer is 0.01 to 1,000 gram equivalents to 1 gram equivalent of organolithium. And they can be used alone or as a mixture of any combination of two or more of them.

It is preferable to remove any impurity, such as water, oxygen, or carbon dioxide, existing in the polymerization system, before conducting a polymerization.

By using the process in accordance with the present invention, a polymer having any desirable molecular weight can easily and reliably be obtained. The molecular weight of resulting polymer can be controlled by changing the amount of the initiator and the total monomer used, depending upon the application of the copolymer.

Examples of the application of the cured rubber compositions containing the polymer in accordance with the present invention include a vehicle tire, a gasket, a sheet, a belt, a window sill, a shoe, a rubber string, a vibration isolating rubber, a packing, a modifier for various resins, and a compatibilizer for polymer blends. And those which are prepared with multivalent initiator, and have low glass transition temperatures at the same time, are thermoplastic elastomers and can be used for a shoe sole, a floor tile, an adhesive, or a molded article.

The present invention is explained more in detail through the examples and the comparative examples, but is not limited by them.

In the examples, parts and percentages are by weights unless noted otherwise.

Measurements were made as follows.

The number average molecular weight (Mn) and the molecular weight distribution (Mw/Mn) of a polymer were measured by gel permeation chromatography (G.P.C., HLC-8020 manufactured by Tosoh Corporation with a series of two GMH-XL type columns) and calculated by differential refractive index (RI) and UV absorption at 254 nm reduced to polystyrene. A monodispersed styrene was used as a standard.

A conversion of a polar monomer is shown as a ratio of the polar monomer converted into a polar polymer block against the fed polar monomer, and was obtained by following two methods. The results of the two method agree with each other pretty well.

1) Since the conversion of a conjugated diene monomer and/or an aromatic hydrocarbon monomer into a non-polar polymer in the step A can be considered as 100%, the conversion of the polar monomer is a ratio of the weight of the polar polymer obtained, which can be calculated by subtracting the weight of non-polar monomers from the weight of the obtained block copolymer, against the weight of the polar polymer estimated from the weight of the polar monomer added to the system.

2) By $^1$H-NMR spectroscopy, the integral area ratio of the peaks of protons of methyl group in the t-butyl group, protons in the pyridine ring, and protons of methyl groups on nitrogen atom to those of the protons in the main chain of the polymer, in the case of the t-butylmethacrylate, of the vinylpyridines, and of N,N-dimethylacrylamide, respectively.

The microstructures of a conjugated diene polymer block or the conjugated diene portion of a conjugated diene-aromatic vinyl hydrocarbon copolymer block were measured by an infrared method according to D. Morero et al., *Chem. e. Ind.*, Vol. 41, Page 758 (1959). The styrene content was obtained from the absorption intensity of the aromatic hydrogens by $^1$H-NMR spectroscopy.

Cyclohexane was degassed under nitrogen flow, and dried with active alumina before use. The polar monomers were dried in nitrogen flow before distilled. Butyllithium and triethylaluminum were obtained from Kanto Kagaku Co., Ltd. as a hexane solution and used as obtained. All other raw materials were dehydrated and purified before use.

EXAMPLE 1

Polymerizations were carried out by following 2 step method.

Step A

Sixty grams of butadiene, and 330 grams of cyclohexane were fed into a 1 liter of glass bottle with rubber stopper. Then, 1.1 millimoles of tetrahydrofuran, as an randomizer, and 0.54 millimoles of butyllithium, as an initiator, were added. The system was stirred at 50° C. for four hours in a bath to obtain polymer A.

A small portion of the polymer A solution was taken and Mn, Mw/Mn, and molecular weight distribution curve were obtained. Mn is $1.79 \times 10^5$, Mw/Mn is 1.08, and the molecular weight distribution curve is shown in FIG. 1.

Two mole equivalents of triethylaluminum in hexane per 1 mole equivalent of lithium was added and the solution was stirred for 15 minutes at 50° C.

Step B

Six grams of t-butylmethacrylate was added to the system and stirred for 30 minutes at 50° C. to obtain copolymer B. To the copolymer B solution, about 1 millimole of isopropanol was poured, then the entire solution was dumped into about 500 milliliters of isopropanol/water mixture (80/20) in order to isolate the copolymer. The copolymer B was dried in a vacuum oven.

The yield and the results of analysis are shown in Table 2, and the molecular weight distribution curve is shown in FIG. 1A.

EXAMPLES 2, 3, AND 4

Examples 2, 3, and 4 were carried out in the same method as Example 1, except isobornylmethacrylate, N,N-dimethylacrylamide, and 4-vinylpyridine were used instead of t-butylmethacrylate, respectively. The formula of polymerization system and polymerization conditions are shown in Table 1 and the results are shown in Table 2.

The molecular weight distribution curve of Example 3 is shown in FIG. 2A.

EXAMPLE 5

Examples 5 was carried out in the same method as Example 1, except styrene and butadiene were used in step A as monomers and polymerization period was changed to 2.5 hours. The formula of polymerization system and polymerization conditions are shown in Table 1 and the results are shown in Table 2.

EXAMPLE 6

Examples 6 was carried out in the same method as Example 1, except dilithio-p-diisobutylbenzene (prepared as described in R. P. Foss et al., *Macromolecule*, 10, 287, (1977)) was used instead of butyllithium as an initiator. The formula of polymerization system and polymerization conditions are shown in Table 1 and the results are shown in Table 2.

Comparative Example 1

Comparative Examples 1 was carried out in the same method as Example 1, except no triethylaluminum was used at all. The formula of polymerization system and polymerization conditions are shown in Table 1 and the results are shown in Table 2.

The molecular weight distribution curve of Comparative Example 1 is shown in FIG. 1A.

Comparative Example 2 AND 3

Comparative Examples 2 and 3 were carried out in the same method as Example 1, except isobornylmethacrylate, N,N-dimethylacrylamide, and 4-vinylpyridine were used without using triethylaluminum, respectively. The formula of polymerization system and polymerization conditions are shown in Table 1 and the results are shown in Table 2.

The molecular weight distribution curve of Comparative Example 2A is shown in FIG. 2.

Comparative Example 4

Comparative Examples 4 was carried out in the same method as Comparative Example 2, except the polymerization conditions for step B were for 1.5 hours at 20° C. The formula of polymerization system and polymerization conditions are shown in Table 1 and the results are shown in Table 2.

The molecular weight distribution curve is shown in FIG. 2B.

TABLE 1

| | Step A | | | | | | | | Step B | | | | |
|---|---|---|---|---|---|---|---|---|---|---|---|---|---|
| | Styrene (g) | Butadiene (g) | Cyclohexane (g) | Initiator Type | Amount (mmol Li) | THF (mmol) | Temperature (°C.) | Period (hr.) | (Et)$_3$Al (eq/Li) | Polar Monomer Type | Amount (g) | Temperature (°C.) | Period (hr.) |
| Ex. 1 | 0 | 60 | 330 | BuLi | 0.54 | 1.1 | 50 | 4 | 2 | TBMA | 6.0 | 50 | 0.5 |
| Ex. 2 | 0 | 60 | 330 | BuLi | 0.54 | 1.1 | 50 | 4 | 2 | IBMA | 6.0 | 50 | 0.5 |
| Ex. 3 | 0 | 60 | 330 | BuLi | 0.54 | 1.1 | 50 | 4 | 2 | DMAA | 6.0 | 50 | 0.5 |
| Ex. 4 | 0 | 60 | 330 | BuLi | 0.54 | 1.1 | 50 | 4 | 2 | 4VP | 6.0 | 50 | 0.5 |
| Ex. 5 | 12 | 48 | 330 | BuLi | 0.54 | 30.0 | 50 | 2.5 | 2 | TBMA | 6.0 | 50 | 0.5 |
| Ex. 6 | 0 | 60 | 330 | DIPB | 0.28 | 0.56 | 50 | 4 | 2 | TBMA | 6.0 | 50 | 0.5 |
| Comp. Ex. 1 | 0 | 60 | 330 | BuLi | 0.54 | 1.1 | 50 | 4 | 0 | TBMA | 6.0 | 50 | 0.5 |
| Comp. Ex. 2 | 0 | 60 | 330 | BuLi | 0.54 | 1.1 | 50 | 4 | 0 | DMAA | 6.0 | 50 | 0.5 |
| Comp. Ex. 3 | 0 | 60 | 330 | BuLi | 0.54 | 1.1 | 50 | 4 | 0 | 4VP | 6.0 | 60 | 0.5 |
| Comp. Ex. 4 | 0 | 60 | 330 | BuLi | 0.54 | 1.1 | 50 | 4 | 0 | DMAA | 6.0 | 20 | 1.5 |

Note:
TBMA: t-butylmethacrylate
IBMA: isobornylmethacrylate
DMAA: N,N-dimethylacrylamide
4VP: 4-vinylpyridine
(ET$_3$)Al: triethylaluminum

TABLE 2

| | GPC | | Area Ratio of High Molecular Weight Polymer (%) | Microstructure | | Yield of Total Polymer (%) | Conversion of Polar Monomer (%) |
|---|---|---|---|---|---|---|---|
| | Mn (× 10⁵) | Mw/Mn (%) | | Styrene Content (wt %) | Vinyl Content (wt %) | | |
| Ex. 1 | 1.89 | 1.11 | <5 | 0 | 17 | 100 | 100 |
| Ex. 2 | 1.91 | 1.12 | <5 | 0 | 16 | 99 | 89 |
| Ex. 3 | 1.80 | 1.14 | <5 | 0 | 17 | 98 | 78 |
| Ex. 4 | 1.82 | 1.13 | <5 | 0 | 17 | 98 | 78 |
| Ex. 5 | 1.87 | 1.11 | <5 | 20 | 59 | 100 | 100 |
| Ex. 6 | 2.06 | 1.21 | <5 | 0 | 16 | 98 | 78 |
| Comp. Ex. 1 | 2.01 | 1.34 | 20 | 0 | 16 | 93 | 23 |
| Comp. Ex. 2 | 2.02 | 1.48 | 31 | 0 | 17 | 92 | 12 |
| Comp. Ex. 3 | 1.91 | 1.35 | 25 | 0 | 17 | 92 | 12 |
| Comp. Ex. 4 | 2.30 | 1.28 | 15 | 0 | 16 | 94 | 34 |

The block polymer in accordance with the present invention could be obtained without any restriction in types of monomers of both step A and step B, and the polymerization of a polar monomer was proceeded rapidly at 50° C. The fact that the polymer obtained had both non-polar polymer block and polar polymer block could be seen in the molecular weight and the molecular weight distribution curve of Example 1; 1) The polymer A showed a molecular weight of $1.79 \times 10^5$ and the copolymer B showed a molecular weight of $1.89 \times 10^5$, which was larger than that of the polymer A; 2) The infrared spectrum of the copolymer B after purified by reprecipitation showed a peak at 1730 cm$^{-1}$ which was attributed by carbonyl group of the methacrylate polar monomer, and the intensity of this peak is proportional to the content of the polar monomer. And the fact that the molecular weight distribution of copolymer B (1.11) was nearly equal to that of polymer A (1.08) ensured that the polymerization of the polar monomer occurred at the living ends of polymers. This could also be supported by the fact that, in general, the molecular weight distribution of a polymer obtained by other than anionic polymerization becomes broader. Furthermore, the molecular weight distribution curve of copolymer B had only one peak and any peak for neither non-polar polymer nor polar polymer could be seen. All of these could be the supports to show that the polymer obtained was a polymer containing a non-polar polymer block and a polar polymer block.

The polymer of Example 6 obtained by using dilithiodiisopropenylbenzene as an initiator showed a high modulus, which indicated that the polymer obtained has a structure described as (Polar-block)-(Non-polar-block)-(Polar-block).

Furthermore, as shown in FIGS. 1A–1B and 2A–2B, the block polymer in accordance with the present invention showed a narrow molecular weight distribution and, unlike the polymers obtained in the comparative examples, no additional formation of an undesirable higher molecular weight polymer was observed, the formations of which were the result of side reactions which were caused by the high reactivity of the polar monomer. The fact that the polymers in accordance with the present invention did not contain those higher molecular weight polymers indicated that in the process in accordance with the present invention, the polymer carbanion can be considered to have reacted to the double bond of the polymer monomer selectively instead of conducting any side reaction.

As shown in Table 2, the process in accordance with the present invention showed a high conversion of the polar monomer and a high yield of the total polymer. Furthermore, since the organic compound which can form an ate complex have a high reactivity towards a polymerization impurity, such as water and oxygen, when the compound is added to the polymerization system, there will be little impurity left to cause the deactivation of the active polymer end. As a result, the polar monomer can react to form a block polymer without any difficulty.

On the other hand, the polymers obtained by the processes of comparative examples showed a low conversion of the polar monomer and a high content of undesirable higher molecular weight polymers. This indicates that the processes shown in the comparative examples had side reactions which declined the polymerization reactivity, formed undesirable branched, high molecular weight polymer, and broadened molecular weight distribution.

As shown above, by taking the process in accordance with the present invention, microstructure of the polar polymer block can be controlled as desired, and a polymer with a narrow molecular weight distribution can be obtained with high yield and with good productivity without lowering the polymerization temperature.

While the invention has been described in detail and with reference to specific embodiments thereof, it will be apparent to one skilled in the art that various changes and modifications can be made therein without departing from the spirit and scope thereof.

What is claimed is:

1. A process for preparing a block copolymer comprising the steps of:

(A) polymerizing a non-polar monomer in the presence of an anionic initiator to form a non-polar polymer block having an active end, wherein an organic compound, which contains a main group element of group II or III, is reacted with said active end to form an ate complex during or after formation of the non-polar polymer block; and (B) reacting a polar monomer with said ate complex to form a polar polymer block.

2. The process in accordance with claim 1, wherein the non-polar polymer block is prepared by polymerizing or copolymerizing a non-polar monomer selected from the group consisting of a conjugated diene compound and an aromatic vinyl hydrocarbon monomer.

3. The process in accordance with claim 2, wherein the conjugated diene monomer is 1,3-butadiene.

4. The process in accordance with claim 2, wherein the aromatic vinyl hydrocarbon monomer is styrene.

5. The process in accordance with claim 1, wherein the polar monomer is selected from the group consisting of methacrylates or acrylates with an alcohol residue having 1 to 20 carbon atoms, N,N-dialkylacrylamides, and vinylpyridines.

6. The process in accordance with claim 5, wherein the alcohol residue is selected from the group consisting of a secondary and a tertiary group.

7. A process for preparing a block copolymer comprising the steps of:

(A) polymerizing a non-polar monomer in the presence of an anionic initiator to form a non-polar polymer block having an active end, wherein an organic compound of the formula $M^1R^1R^2$, wherein $M^1$ is a main element of group II, each of $R^1$ and $R^2$ is selected from the group consisting of an aliphatic hydrocarbon compound of 1 to 20 carbon atoms, a cycloaliphatic hydrocarbon compound of 2 to 20 carbon atoms, and an aromatic hydrocarbon compound of 6 to 20 carbon atoms, is reacted with said active end to form an ate complex during or after formation of the non-polar polymer block; and (B) reacting a polar monomer with said ate complex to form a polar polymer block.

8. A process for preparing a block copolymer comprising the steps of:

(A) polymerizing a non-polar monomer in the presence of an anionic initiator to form a non-polar polymer block having an active end, wherein an organic compound of the formula $M^1R^1R^2$, wherein $M^1$ is magnesium or zinc, each of $R^1$ and $R^2$ is selected from the group consisting of an aliphatic hydrocarbon compound of 1 to 20 carbon atoms, a cycloaliphatic hydrocarbon compound of 2 to 20 carbon atoms, and an aromatic hydrocarbon compound of 6 to 20 carbon atoms, is reacted with said active end to form an ate complex during or after formation of the non-polar polymer block; and (B) reacting a polar monomer with said ate complex to form a polar polymer block.

9. A process in accordance with claim 7, wherein the organic compound is diethylmagnesium, dicyclohexylmagnesium, diphenylmagnesium, diethylzinc, dibutylzinc, or diphenylzinc.

10. The process in accordance with claim 1, wherein the organic compound which form an ate complex has a formula of $M^2R^3R^4R^5$, wherein $M^2$ is a main element atom of III group, each of $R^3$, $R^4$, and $R^5$ are selected from the group consisting of aliphatic hydrocarbon compounds of 1 to 20 carbon atoms, cycloaliphatic hydrocarbon compounds of 2 to 20 carbon atoms, and aromatic hydrocarbon compounds of 6 to 20 carbon atoms.

11. The process in accordance with claim 9, wherein the $M^2$ is aluminum or boron.

12. The process in accordance with claim 9, wherein the organic compound which form an ate complex is triethylaluminum.

13. The process in accordance with claim 1, wherein the amount of the organic compound which can form an ate complex is 0.5 to 10.0 mole equivalent per 1 mole equivalent of the initiator.

14. The process in accordance with claim 1, wherein the initiator is selected from the group consisting of n-butyllithium and sec-butyllithium.

15. The process in accordance with claim 1, wherein the initiator is a multivalent initiator.

16. The process in accordance with claim 16, wherein the initiator is selected from the group consisting of a reaction product of diisopropenylbenzene and n-butyllithium and a reaction product of diisopropenylbenzene and sec-butyllithium.

17. The process in accordance with claim 1, wherein the amount of initiator is 0.05 to 20.0 millimoles per 100 grams of the total monomer.

18. The process in accordance with claim 1, wherein a randomizer is used to form the non-polar polymer block.

19. The process in accordance with claim 18, wherein the randomizer is an ether compound.

20. The process in accordance with claim 1, wherein the non-polar polymer block is styrene-butadiene random copolymer and the polar polymer block is poly-t-butylmethacrylate.

21. The process in accordance with claim 1, wherein the molecular weight distribution (Mw/Mn) is lower than 2.

22. The process in accordance with claim 1, wherein the polymerization temperature is between −80° C. and 150° C.

23. The process in accordance with claim 1, wherein the polymerization is carried out in a solvent.

24. The process in accordance with claim 23, wherein the solvent is saturated hydrocarbon compounds having 5 to 10 carbon atoms.

25. The process in accordance with claim 1, wherein the organic compound which can form an ate complex is added after the conversion of the non-polar polymer block reaches 90%.

* * * * *